United States Patent [19]

Solar

[11] Patent Number: 4,870,540
[45] Date of Patent: Sep. 26, 1989

[54] ELECTRICAL CAPACITOR

[75] Inventor: Josef Solar, Heidenheim, Fed. Rep. of Germany

[73] Assignee: Siemens Aktiengesellschaft, Munich, Fed. Rep. of Germany

[21] Appl. No.: 296,794

[22] Filed: Jan. 13, 1989

[30] Foreign Application Priority Data

Jan. 27, 1988 [DE] Fed. Rep. of Germany ....... 3802352

[51] Int. Cl.$^4$ .............................................. H01G 4/04
[52] U.S. Cl. .................................................. 361/327
[58] Field of Search ................ 361/272, 275, 315–319, 361/327, 521, 15

[56] References Cited

U.S. PATENT DOCUMENTS

| | | | |
|---|---|---|---|
| 2,163,262 | 6/1939 | Rhodes | 361/521 X |
| 4,296,453 | 10/1981 | Aigle et al. | 361/275 |
| 4,626,959 | 12/1986 | Shedigian et al. | 361/315 |
| 4,754,361 | 6/1988 | Venturini | 361/272 X |

FOREIGN PATENT DOCUMENTS 1108098  4/1968  United Kingdom .

Primary Examiner—Donald A. Griffin
Attorney, Agent, or Firm—Hill, Van Santen, Steadman & Simpson

[57] ABSTRACT

An electrical capacitor is built into a metallic housing, the capacitor having end contact layers and being fixed in the housing with the assistance of pressure ribs arranged at an outside edge of an insulating cap. The insulating cap has an inner space in which a terminal element is arranged. The other terminal element is insulated from the differently polarized end contact layer by a connector or sleeve arranged in the insulating cap. The housing the filled with an insulating oil up to a defined level. Aeration holes are arranged at an upper side of is insulating cap to prevent gas bubbles from arising under the insulating cap.

9 Claims, 1 Drawing Sheet

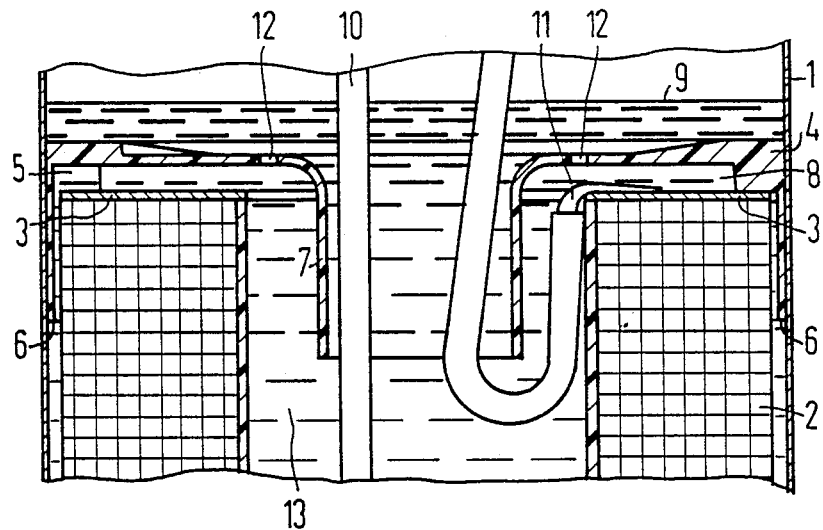

ELECTRICAL CAPACITOR

BACKGROUND OF THE INVENTION

(1) Field of the Invention

The present invention is directed generally to an electrical capacitor, and more particularly to a power capacitor in an oil filled housing.

(2) Description of the Related Art

An oil filled capacitor is disclosed, for example, in German Application No. D-28 25 377 C2 which corresponds to U.S. Pat. No. 4,296,453.

During manufacture of the known capacitors, one or more windings are stacked on top of one another as needed, possibly separated by intermediate caps. The windings are wired and inserted into metal tubes as a winding packet closed with a lower insulating cap and with an upper insulating cap. To prevent partial electrical discharges, the capacitors are then impregnated with oil where the quantity of oil after impregnation is set so that a buffer gas volume is present in the housing but so that the uppermost winding together with the upper insulating cap is immersed below the level of the oil.

It is necessary to provide the buffer gas volume in cylindrical housings to absorb the increase in pressure due to expansion of the material at elevated temperatures since the wall of the housing does not yield. Yielding of the floor and cover are not adequate to compensate for the expansion since each of these only comprises an extremely small portion of the surface.

Furthermore, the gas bubble must not be situated only above the winding where the insulation cap for the winding is placed.

In terms of order of magnitude, the dielectric strength, or breakdown electric field, of a solid insulator lies at about 200 volts per micrometer, while that of a liquid insulator lies at about 20 volts per micrometer and for gases the dielectric strength only amounts to about 2 volts per micrometer. Accordingly, the electrical insulation between the housing and the winding is weakened by the lower dielectric strength of the gas when the gas bubble displaces the impregnation oil at a critical location.

Since, for example, capacitors are stored horizontally during transport, there is a risk that the gas bubble will migrate under the upper insulation cap. When the capacitors are again placed upright, such as for mounting this gas bubble will remain under the insulation cap and, in the worst case, will fill out the entire volume under the cap. It is not possible for the gas bubble to leave this location so that the upper end of the capacitor winding, which generally has a metallic contact or schoopage, layer is no longer situated under the oil but is exposed by the gas bubble. Partial electrical discharges can arise from the outside edge of the winding under the cap to the housing given alternating voltages of greater than about 1 kilovolt.

These partial discharges can be identified, for example, by measuring a capacitance $C_{BG}$ between the shorted metallic coatings on the winding and the housing. The current is then calculated at a test voltage $U_P$. When the current is greater than corresponds to the capacitance according to the equation $I_P = U_P \cdot \omega \cdot C_{BG}$ ($\omega$ is the frequency of the test voltage), this indicates the presence of partial discharges.

To eliminate the described difficulties, there have been previous attempts to grind off or file off the outside edges of the end contact layers from the blank winding layer at the end, or to increase the distance from the housing by applying a wrapping of plastic or paper having a thickness of between 1 to 3 micrometers. Despite all these measures, one must still accept an up to threefold increase of the insulation current due to partial discharges as the result of economical reasons.

SUMMARY OF THE INVENTION

It is an object of the invention to provide an electrical capacitor wherein partial discharges in the insulation between the capacitor winding coating and the housing are completely avoided. It is a further object to permit gas bubbles trapped under an insulating cap of an oil filled capacitor to escape. Another object is to insure that the edges of the metal coated capacitor winding ends are immersed in oil to increase the dielectric constant between the metal coatings and the housing.

These and other objects are inventively achieved in that at least one aeration hole is provided extending through an upper side insulating cap for the capacitor. An expedient development includes an insulation cap which has a central sleeve and which has its greatest distance for the metallic schoopage layer at the base of the sleeve. The aeration hole is then arranged at the location of this greatest distance between the insulating cap and the metallic end contact layer. A plurality of such holes may also be provided.

The subject matter of the invention achieves the advantage by permitting gas bubbles which have migrated under the insulating cap to escape through the aeration hole so that the upper end contact layer of the capacitor is completely covered by insulating oil.

BRIEF DESCRIPTION OF THE DRAWING

A single FIGURE shows a fragmentary cross section of the capacitor according to the principals of the present invention.

DESCRIPTION OF THE PREFERRED EMBODIMENTS

In the FIGURE is shown an upper portion of a capacitor. The capacitor may be constructed as shown in U.S. Pat. No. 4,296,453, incorporated by reference herein. The capacitor includes a winding 2 having an upper end contact layer 3. The contact layer 3 is a metallic layer applied by the schoopage method. The winding 2 is fixed in a cylindrical metal housing 1 by an insulating cap 4 which has pressure ribs 5 at its edge against which the winding presses. At its outside, the insulating cap 4 includes projections 6 extending between the housing 1 and the winding 2 for insulating the capacitor 2 from the housing 1. A sleeve 7 is arranged at the inside of the insulating cap 4 and extends from a central opening into a core hole 13 of the capacitor 2. The housing 1 is filled with an insulating oil up to a level 9 so that at least the upper end contact layer 3 is covered with oil.

The insulating cap 4 is formed so that a space 8 is formed thereunder more toward the center next to the pressure ribs 5 arranged at the edge. The space 8 insures that the cap 4 is at a distance from the contact layer 3 so that any trapped gas bubbles accumulate there. A terminal element or wire 11 is soldered or welded to the upper end contact layer 3 since there is adequate room in the space 8. The inner sleeve 7 has a length which is sufficiently long to insulate a second terminal element or wire 10 from the differently polarized end contact layer 3. The second terminal element or wire 10 is connected, for example, to a lower end contact layer (not shown) at the opposite end of the capacitor winding 2.

According to the present invention, at least one aeration hole 12 is arranged extending through the upper side of the insulating cap 4.

Although the provision of a single aeration hole is fundamentally adequate since the spaces 8 under the of cap 4 are in communication with one another, a reliable aeration in this arrangement is only guaranteed when the capacitor is operated in an exactly vertical position. If there is slight tilting, a gas bubble cannot be avoided in all instances, such as when the aeration hole 12 is situated on a side of the insulating cap 4 which lies at a lower position. It is more expedient to provide a plurality of aeration holes 12 for this reason in every instance.

It is especially advantageous that the insulating cap 4 have a highest point which is reached at a foot or base of the inner sleeve 7 in the direction toward the middle in order to position the aeration holes 12 at that location.

Tests with the inventively formed insulating cap 4 have shown that the insulating current calculated from the coating to housing capacitance was not increased even given a three fold higher test voltage of, for example, up to 12 kilovolts. Distortion was not identified even using an oscilloscope to observe the insulation current.

The subject matter of the invention, thus, provides a freedom from partial discharges in the coating to housing insulation without requiring additional measures in the manufacture, such as expensive grinding or wrapping.

Although other modifications and changes may be suggested by those skilled in the art, it is the intention of the inventors to embody within the patent warranted hereon all changes and modifications as reasonably and properly come within the scope of their contribution to the art.

I claim:

1. An improved electrical wound capacitor having end contact layers provided with terminal elements, the capacitor being built into a metallic housing with an insulator cap arranged in an interior of the housing, the insulating cap having pressure ribs at its edges for fixing the capacitor, the insulating cap forming a space towards a middle thereof for accepting the terminal elements, projections arranged at an outside of the insulating cap for insulating the capacitor from the housing, a sleeve extending into a core hole of the capacitor and being arranged at an inside of insulating cap, the housing being filled with an insulating oil up to a level so that at least the end contact layers are covered with oil, the improvement comprising:
at least one aeration hole arranged at an upper side of the insulating cap.

2. An improved electrical wound capacitor as claimed in claim 1, wherein the insulating cap has its greatest distance from one of the end contact layers at a base of the sleeve, said at least one aeration hole being arranged at a location of the greatest distance between the insulating cap and the end contact layer.

3. An electrical oil-filled capacitor, comprising:
a metallic housing;
a capacitor winding having a central core opening, said capacitor winding being mounted in said metallic housing;
an end contact layer on a first end of said capacitor winding;
an insulating cap mounted within said housing and spaced from said end contact layer of said capacitor winding, said insulating cap having a central sleeve extending into said central core opening of said capacitor winding;
an electrical conductor connected to said end contact layer and extending through said central sleeve;
an insulating oil in said housing in sufficient quantity to cover said capacitor winding yet leaving a buffer gas bubble in said housing; and
at least one opening through said insulating cap to form an aeration hole through which said buffer gas bubble may pass to insure coverage of said capacitor winding by said oil.

4. An electrical oil-filled capacitor as claimed in claim 3, wherein said at least one opening including a plurality of further openings in said insulating cap.

5. An electrical oil-filled capacitor as claimed in claim 4, wherein said plurality of openings are adjacent said sleeve.

6. An oil-filled capacitor, comprising:
a cylindrical metal housing;
a cylindrical capacitor winding mounted in said metal housing, said capacitor winding having a central core opening extending therethrough;
metallic contact layers applied to opposite end faces of said cylindrical capacitor winding;
electrical conductors connected to said metallic contact layers at said opposite end faces, at least one of said electrical conductors extending through said central core opening;
an insulator cap mounted in said metal housing and having means for fixing said capacitor winding in said housing, said insulator cap having a central opening and a sleeve about said central opening, said sleeve extending into said central core opening of said capacitor,
said electrical conductors extending through sleeve and said central opening of said of said insulator cap;
an insulating oil in said metal housing to electrically insulate said capacitor winding and said contact layers from said housing, said oil leaving a gas bubble in said housing; and
an aeration hole through said insulator cap through which said gas bubble can pass.

7. An oil-filled capacitor as claimed in claim 6, further comprising:
additional aeration holes in said insulator cap.

8. An oil-filled capacitor as claimed in claim 6, wherein said aeration hole is adjacent said sleeve.

9. An oil-filled capacitor as claimed in claim 6, wherein said aeration hole extends through said insulator cap at a location where said insulator cap is spaced farthest from one of said contact layers.

* * * * *